United States Patent
Zhibo et al.

(10) Patent No.: US 11,582,675 B2
(45) Date of Patent: Feb. 14, 2023

(54) ROUTE SELECTION IN A WIRELESS COMMUNICATION SYSTEM

(71) Applicant: Hitachi Energy Switzerland AG, Baden (CH)

(72) Inventors: Pang Zhibo, Västerås (SE); Xiaolin Jiang, Stockholm (SE); Dacfey Dzung, Wettingen (CH); Michele Luvisotto, Västerås (SE); Roger Jansson, Västerås (SE); Carlo Fischione, Stockholm (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 16/973,147

(22) PCT Filed: May 15, 2019

(86) PCT No.: PCT/EP2019/062497
§ 371 (c)(1),
(2) Date: Dec. 8, 2020

(87) PCT Pub. No.: WO2019/242943
PCT Pub. Date: Dec. 26, 2019

(65) Prior Publication Data
US 2021/0250842 A1 Aug. 12, 2021

(30) Foreign Application Priority Data
Jun. 18, 2018 (EP) ..................... 18178187

(51) Int. Cl.
*H04W 40/16* (2009.01)
*H04B 17/336* (2015.01)
(Continued)

(52) U.S. Cl.
CPC .......... *H04W 40/16* (2013.01); *H04B 17/336* (2015.01); *H04L 27/265* (2013.01);
(Continued)

(58) Field of Classification Search
None
See application file for complete search history.

(56) References Cited

U.S. PATENT DOCUMENTS

| 6,954,435 B2 | 10/2005 | Billhartz et al. |
| 7,058,021 B2 | 6/2006 | Srikrishna et al. |

(Continued)

FOREIGN PATENT DOCUMENTS

| CN | 101635695 A | 1/2010 |
| EP | 2271043 A2 | 1/2011 |

(Continued)

OTHER PUBLICATIONS

Wikipedia, "Intersymbol interference", Jun. 19, 2019, 5 pages.
(Continued)

*Primary Examiner* — Anh Vu H Ly
(74) *Attorney, Agent, or Firm* — Slater Matsil, LLP

(57) ABSTRACT

A method (100) of route selection in a wireless communication system and a control system (40) is provided. The method includes selecting a route between a first node (1) and a second node (2) and comprises: —evaluating (110) a plurality of possible routes (R1, R2, R3, R4), at least one route (R2, R3, R4) including a third node (3, 4) between the first and the second node; and —selecting (160) the route that has the lowest latency among the possible routes. Especially the method (100) includes: —selecting (120) parameter settings for each link of the possible routes, said selecting (120) comprising; —selecting (130) the length of the cyclic prefix, —evaluating (140) combinations of the selected cyclic prefix and different settings of the at least one further parameter of the physical layer; —selecting (150) the parameter settings that has lowest estimated latency and fulfils at least one communication quality criterion.

18 Claims, 6 Drawing Sheets

(51) Int. Cl.
- *H04L 27/26* (2006.01)
- *H04L 45/24* (2022.01)
- *H04W 40/02* (2009.01)
- *H04L 43/0852* (2022.01)
- *H04L 45/00* (2022.01)
- *H04L 45/302* (2022.01)
- *H04L 45/122* (2022.01)
- *H04L 45/12* (2022.01)

(52) U.S. Cl.
CPC ...... *H04L 27/2607* (2013.01); *H04L 43/0852* (2013.01); *H04L 45/122* (2013.01); *H04L 45/123* (2013.01); *H04L 45/24* (2013.01); *H04L 45/302* (2013.01); *H04L 45/70* (2013.01); *H04W 40/02* (2013.01)

(56) References Cited

U.S. PATENT DOCUMENTS

| | | | | |
|---|---|---|---|---|
| 8,705,555 | B2* | 4/2014 | Imai | H04L 41/0803 370/430 |
| 8,891,705 | B1 | 11/2014 | Zhang et al. | |
| 8,964,649 | B2 | 2/2015 | Jami et al. | |
| 2004/0156345 | A1* | 8/2004 | Steer | H04L 45/12 370/395.31 |
| 2006/0013325 | A1 | 1/2006 | Agrawal et al. | |
| 2007/0133668 | A1* | 6/2007 | Naguib | H04L 27/2647 375/227 |
| 2008/0101490 | A1 | 5/2008 | Kawauchi et al. | |
| 2010/0002757 | A1* | 1/2010 | Birru | H04L 27/2657 375/226 |
| 2012/0250563 | A1 | 10/2012 | Liu et al. | |
| 2013/0258939 | A1* | 10/2013 | Wang | H04W 40/12 370/315 |
| 2015/0319629 | A1 | 11/2015 | Dabirmoghaddam et al. | |
| 2016/0094318 | A1 | 3/2016 | Shattil | |
| 2017/0149661 | A1 | 5/2017 | Ryan et al. | |
| 2018/0213407 | A1* | 7/2018 | Miao | H04W 16/14 |

FOREIGN PATENT DOCUMENTS

| | | |
|---|---|---|
| EP | 2429090 A1 | 3/2012 |
| JP | 2010522471 A | 7/2010 |

OTHER PUBLICATIONS

Athaudage, C.R.N., et al., "Delay-spread estimation using cyclic-prefix in wireless OFDM systems", QUT Digital Resources, IEE Proceedings—Communications, vol. 151, Issue 6, Dec. 24, 2004, pp. 559-566.

Luvisotto, Michele, et al., "Physical Layer Design of High-Performance Wireless Transmission for Critical Control Applications", IEE Transactions on Industrial Informatics, vol. 13, No. 6, Dec. 2017, pp. 2844-2854.

* cited by examiner

ROUTE SELECTION IN A WIRELESS COMMUNICATION SYSTEM

CROSS-REFERENCE TO RELATED APPLICATIONS

This application is a national stage application of International Application No. PCT/EP2019/062497, filed on May 15, 2019, which application claims priority to European Patent Application No. 18178187.3, filed on Jun. 18, 2018, which applications are hereby incorporated herein by reference.

TECHNICAL FIELD

The present invention relates generally to wireless communication systems, especially to route selection in a wireless communication system configured with relay nodes. The present invention is mainly intended for industrial settings such as grid automation in power systems, communication in manufacturing systems or control systems for industrial processes or automation.

BACKGROUND AND PRIOR ART

Route selection within wireless communication networks is a concept wherein a route that may contain several hops between two nodes, or base stations, are selected. Typically, a route having as few hops as possible may be selected in order to provide a fast transmission. In a further approach a route that provides a specific quality of service-level (QoS) may instead be selected. See for example patent application U.S. Pat. No. 6,954,435 B2 (document A) were individual links of possible routes are investigated in terms of QoS (col. 5, line 36-col 6 line 3; col. 2 line 20-25 in document A). The quality requirements of the system in document A include for example delay, number of hops or error rate (col 3 line 23-26 of document A).

Different quality measurements have been used for route selection, and the selection may also be updated. U.S. Pat. No. 7,058,021 (document B), for example, describes a route selection method that continually determine a quality of different routes. A success ratio of received packets for the routes are compared and the most successful route is selected (see abstract of document B).

US 2015/0319629 (document C) shows a further example where the communication quality is improved. A purpose of the method of document C is to improve the quality a selected communication route. The method of document C includes estimating a signal quality on an adjacent channel and switch to the adjacent channel if the quality is better on the adjacent channel than on the present channel (abstract of document C). Also, the method of document C may select another route. Thus, a further purpose is to select a better route as determined by the quality determination (§ 0017 of document CV). The quality of a channel, and/or route, may be determined from signal-to-noise measurements (§ 0019 of document C).

SUMMARY OF INVENTION

An aim of the present invention is to provide an alternative approach, wherein an optimization of reliability and latency is sought. For this purpose, the invention concerns route selection in a wireless communication system, especially an OFDM system (Orthogonal Frequency-Division Multiplexing), wherein a number of parameters in the physical layer of the wireless communication system are selected in order to provide communication having high reliability and low latency. The invention is useful in control systems for electric power grids, such as grid automation, automation of substations or other control systems for power grids that has a demand for high reliability and low latency. It is also useful in industrial manufacturing systems where fast and reliable communications is sought. Thus, a route selection process is provided seeking to optimize the communication in terms of reliability and latency. The wireless communication of the present invention is particularly useful for machine to machine communication in industrial operations where comparatively short messages with commands or measurements are transferred between the base stations of the network.

According to a first aspect, the present invention provides a method of route selection in a wireless communication system that comprises a physical layer including a cyclic prefix and at least one further parameter, wherein a route for wireless communication between a first base station and a second base station is selected. Said method comprising:
evaluating a plurality of possible routes from the first base station to the second base station, where at least one route of the possible routes including a third node, or at least one third node, between the first and the second node, wherein said at least one route includes at least two links,
selecting the route that has the lowest latency among the possible routes;
Especially, the route selection method includes selecting parameter settings for each link of the possible routes including selecting a length of the cyclic prefix and a setting of the at least one further parameter of the physical layer, and including:
selecting the length of a cyclic prefix in view of a first communication quality criterion for the link,
evaluating combinations of the selected cyclic prefix and different settings of at least one further parameter of the physical layer in view of a second communication quality criterion, wherein the evaluating includes estimating the latency for combinations of the selected length of the cyclic prefix and settings of the at least one further parameter that fulfil the second communication quality criterion; and
selecting the parameter settings that has lowest estimated latency and fulfils the second quality criterion.

The selecting of the route that has the lowest latency includes estimating the latencies for each route including adding together the latency for each link of the route and, for each route having a third node between the first node and the second node, adding the processing time of the third node of the route.

A route may include more than one third node, or relay node, between the first and the second node, and for each such route the latency of each link and the processing time of each one of these third nodes should be added together when estimating the latency of each such route. Thus, a route may have at least one third node, wherein the processing time, or processing times, of the at least one third node is added together when estimating the route latency.

The length of cyclic prefix is evaluated in terms of communication quality, and where a shorter length involves a shorter latency. The combination of the selected cyclic prefix, i.e. the cyclic prefix that fulfils the first quality criterion, and the further parameter, or parameters, is evaluated in view of a second communication quality criterion, and in view of the latency of said combination. In this way a route can be selected, which route provides an optimization of low latency and communication quality by means of the selected parameter settings of the link, or links, of the route. This selecting of parameter settings can be done for each route of the wireless communication network.

Cyclic prefix and the further parameters affect the communication quality differently, and a specific first quality criterion is preferred for the cyclic prefix, especially in avoiding self-interference by selecting the cyclic prefix.

In an embodiment, the second communication quality criterion comprises a threshold level for a packet error rate (PER) of the communication in the link.

In an embodiment, the at least one further parameter comprises any of code rate, modulation scheme and FFT size (Fast Fourier Transform). In a further embodiment, at least one further parameter comprises two of code rate, modulation scheme and FFT size. Preferably, at least one further parameter comprises code rate, modulation scheme and FFT size.

Thus, parameters of the physical layer that are selected includes a cyclic prefix and may preferably include code rate, modulation scheme and FFT size, and may include further physical layer parameters. The power level is preferably also selected during the route selection process, wherein a lower power level for the communication is preferred compared to a higher power level. The power level does not affect latency, or transmission time, but a higher power level provides a lower packet error rate.

The routes that may be selected for communication from a first base station to a second base station include a direct link between the first base station and the second base station, as well as multi-hop routes wherein the communication between the first and the second base stations are relayed via at least one further base station; referred to as a third base station or relay base station.

In an embodiment, the first communication quality criterion is a signal to interference and noise criterion for the link in order to avoid self-interference; wherein the selection of cyclic prefix comprises
 obtaining a channel impulse response of the link,
 estimating the signal to interference and noise for the link from the channel impulse response.

The cyclic prefix will affect signal to self-interference, while varying the other parameters will affect a "global" signal to noise ratio. Selecting the cyclic prefix should be done to avoid self-interference. In an embodiment, the signal should, according to the first communication quality criterion, be at least 10 dB stronger than noise and interference. In a further embodiment, the signal should be at least 20 dB stronger than noise and interference.

In a second aspect the present invention provides a network control system configured to perform the route selection of the first aspect. The control system may be provided as a single network controller unit; or may alternatively be distributed among a plurality of control units. In an embodiment the control system comprises a network controller unit that is configured to perform the route selection according to the method of the first aspect. A central standalone network controller is preferred, although such a controller may be provided in a node of the network, such as in a wireless router or in a gateway node.

In a further aspect the present invention provides a computer program product suitable for configuring a network control system for performing the method of the first aspect.

DESCRIPTION OF EMBODIMENTS

Figure 1A:
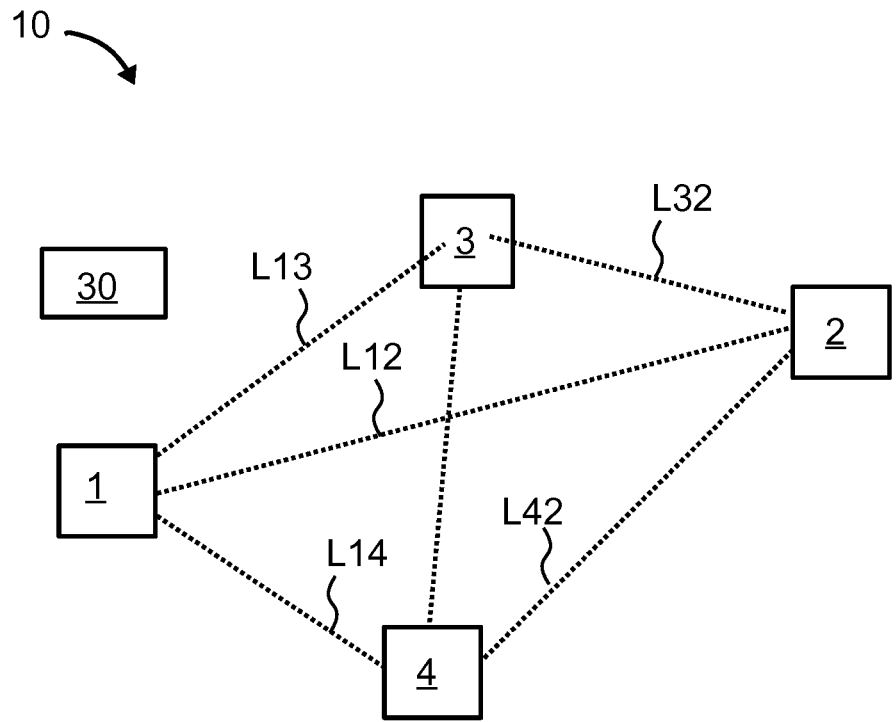
FIGS. 1A-B illustrate a communication network in accordance with embodiments of the invention.
Figure 1B:
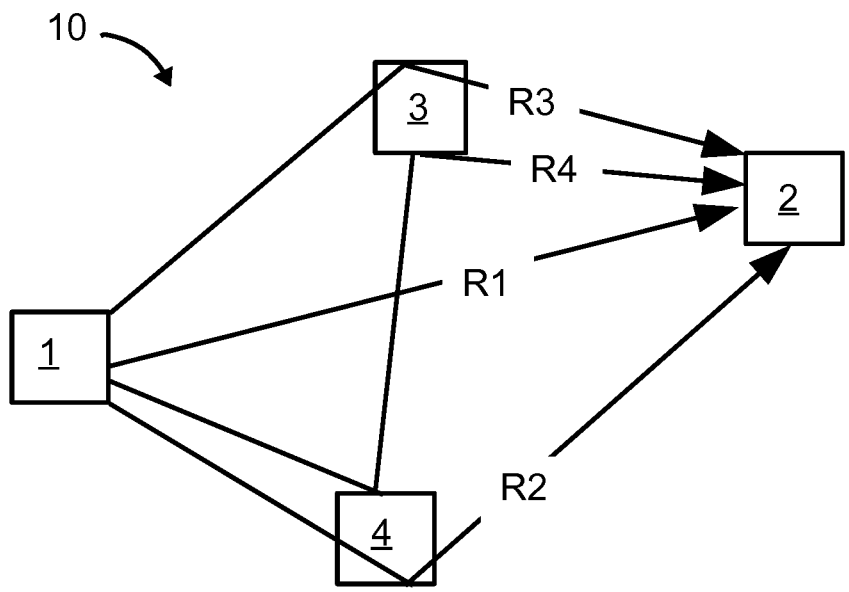

FIGS. 1A-B illustrate a wireless communication network 10 including a plurality of communication nodes, or base stations, 1-4. A network controller 30 is communicatively connected to the base stations 1-4. The network controller 30 is configured to select communication routes in the network 10, for example select route (R1-R4 in FIG. 1B) for communication from a first node, or base station, 1 to a second node, or base station, 2. The selected route may include one or more relay stations, such as third base station 3 and fourth base station 4. Thus, the route (e.g. R1 in FIG. 1B) may include a direct link L12 (in FIG. 1A) from the first station 1 to the second station 2, or a plurality of links such as a link L13 (e.g. route R3 in FIG. 1B) from the first 1 to the third 3 base station and a link L32 between from the third 3 to the second 2, when relaying the communication from the first base station 1 to the second base station 2 via the third base station 3.

The network controller 30 is configured to evaluate possible routes for communication between the first base station 1 and the second base station 2 and select route based on communication speed, i.e. low latency or transmission time, and on communication quality. The route selection method will be further described with reference to FIGS. 2 and 3A-C.

To obtain information about the links L12, L13, L14, L32, L42, the network controller 30 may suitably be configured to instruct the base stations 1-4 to measure the channel impulse response of the links L12, L13, L14, L32, L42. The network controller 30 may also be configured to obtain measurements on communication quality, e.g. the signal to noise ratio (SNR) of the links L12, L13, L14, L32, L42, between the base stations 1-4. For example, each one of the base stations 1-4 is instructed to transmit test signals to the other base stations 1-4, which other base stations receive the test signals and transfer the obtained signals to the network controller 30 for evaluation of the communication link. Especially, the network controller 30 is configured to obtain the channel impulse response of the links L12, L13, L14, L32, L42 of the communication network 10 and select cyclic prefix for each link based on the channel impulse response. The test signal transmissions may also be used for estimating delays, including transmission times and/or propagation times, of the links L12, L13, L14, L32, L42, wherein the network controller 30 may be configured to perform these estimations. The test signal transmissions should be performed using different settings of cyclic prefix length and different settings of other physical layer parameters, such as FFT size, code rate and modulation scheme.

Figure 2:
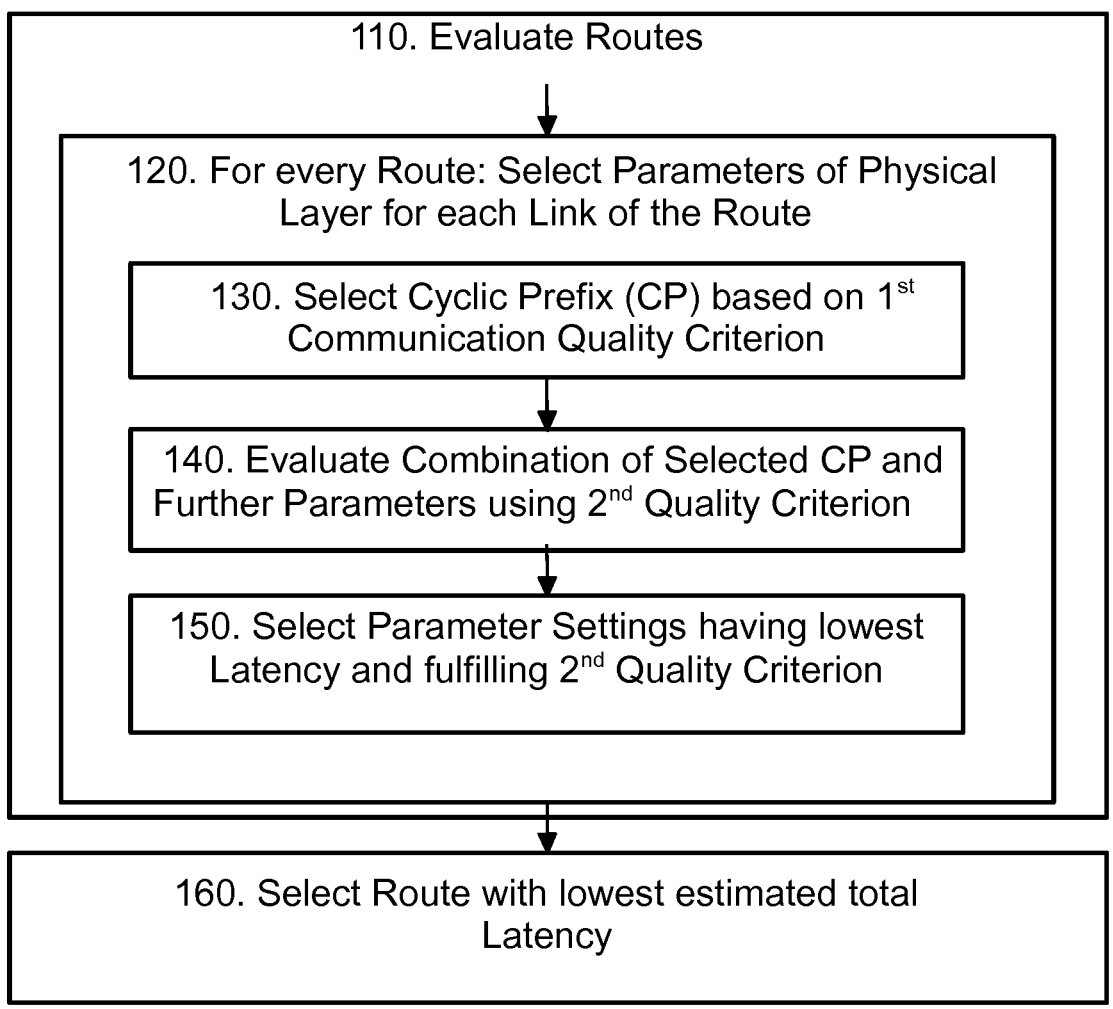
FIG. 2 illustrates an embodiment of a method of route selection.

FIG. 2 illustrates an embodiment of a method 100 for route selection suitable for the network controller 30 of FIGS. 1A-B. The route selection method 100 of FIG. 2 starts with evaluating 110 a number of possible routes between the first node, or base station, 1 and the second node, or base station, 2, and ends with selecting 160 one of the routes R1-R4, wherein the route that has the lowest transmission time or latency is selected. Latency is seen here as an indication of how fast the communication is and can be estimated as the transmission time of a standard sized message of the wireless communication network 10.

A characterizing feature provided by the present invention are the selection 120 of the settings of physical layer parameters, which is carried out during the evaluating 110 of routes R1-R4 in order to perform the selection 160 of one of the routes, in view of both reliability and latency. The selection 120 of parameter settings are performed for each link L12, L13, L14, L32, L42 and are performed in view of the communication quality provided by the evaluated parameter settings.

The method includes selecting 150 the parameter settings of each link that has the lowest latency, provided the parameter settings fulfil communication quality criteria, such as the $1^{st}$ and $2^{nd}$ communication quality criterion in steps 130, 140, for selecting cyclic prefix, and evaluating a combination of the cyclic prefix and further parameters, respectively, in FIG. 2. The transmission time can be used as an approximation for the latency when latencies, of different parameter settings of a link L12, L13, L14, L32, L42, should be compared. The parameter setting that has the lowest transmission time for the link will also have the lowest latency, since the propagation time and the processing times will be approximately the same for different settings. The present invention suggests using calculations to determine the latencies and which parameter combination that has the lowest latency, see equation 1 in page 13. An alternative to estimating latencies by calculation is to measure the latency of each link by sending test signals or test messages.

The route selection method 100 may be carried out during setup of a wireless communication network 10 and subsequently during operation of the network. Selected routes and corresponding parameter settings can suitably be stored in a look-up table provided by the network controller 30, or by another network control system (e.g. 40 in FIG. 4) that may be distributed among several units.

The propagation times for the links, i.e. the time required for a wave to travel between two nodes, can be estimated from the distance between the nodes, i.e. distance times "speed of light". In many situations, when the distances are comparably small, the propagation times are small compared to the transmission times and approximating latency with transmission time can be accurate enough. In other situations the propagation times cannot be ignored. Calculating the propagation times at the set-up of fixed nodes in the wireless network will give the skilled person information on whether the propagation time of a link can be ignored, or not.

The selecting 160 of the route that has the lowest latency preferably includes adding together the latency for each link L13, L14, L32, L42, L34 of the route R1, R2, R3, R4, and processing times of the relay nodes 3, 4 of the route.

Processing time for a node 1-4, especially a relay node 3,4, such as transmit processing time before transmission and receive processing time after the transmission, can be estimated when selecting the nodes for the network from a technical specification of the node. For clarity, the term "transmit processing time" here indicates a time interval before the transmission time, which transmission time in turn is before the propagation time. The processing time can, for example, be measured when the nodes are manufactured/tested and used as a fixed quantity in the route selection process. The processing time will, in general, not change after installation of a node. The processing time can alternatively be measured offline through a training procedure. In such a procedure, a node would be sending a packet and measure the time (the transmit processing time) between the sending command and the start of the actual transmission over the air. Later on, the same node would be receiving a packet and measure the time (the receive processing) between the beginning of the actual reception and the time the first decoded bit is delivered to the software. This processing time quantity is fixed over time, so it does not need to be updated, and can be measured just once.

The selection 120 of parameter settings for the physical layer is the first step when evaluating 110 each of the possible routes R1-R4. The selection 120 of parameter settings for the physical layer includes selecting 130 a cyclic prefix, evaluating 140 combinations of the selected cyclic prefix and further parameter settings of the physical layer and selecting 150 the settings of the further parameters.

The selecting 130 of cyclic prefix is made in order to avoid self-interference, especially inter-symbol interference. The cyclic prefix introduces latency in the communication and a short cyclic prefix is preferred. The selecting 130 of cyclic prefix is based on a quality criterion for the communication, such as a criterion for minimizing or avoiding inter symbol interference.

The selection 130 of the cyclic prefix is suitably based on a channel impulse response (CIR) of the communication link in question, which CIR of the link can be estimated in different ways, for example by performing a simulation including sending and receiving test sequences on the link. A criterion for signal-to-self-interference ratio (self-SINR) in order to limit the inter-symbol interference can be used, for example a 10 dB or 20 dB difference between signal and self-interference. The cyclic prefix would then be selected, based on the obtained CIR so that interferences larger than the criterion for self-SINR ratio is avoided. Thus, a shortest possible length of the cyclic prefix is identified, i.e. shortest possible in view of the self-SINR ratio criterion.

The evaluating 140 of combinations of a selected cyclic prefix and different settings of further parameters of the physical layer depends on a quality criterion that reflects the reliability of the communication that can be provided with the parameter settings in question.

The evaluation 140 of further parameters of the physical layer should be based on estimations of a quality criterion for the resulting communication, wherein preferably a criterion for a maximum packet-error-rate (PER) is utilized. Parameter combinations fulfilling the communication quality criterion is further evaluated, which evaluation includes comparing the transmission time, or latency, between the different parameter combination.

The preferred parameters that are selected in the route selection method: code rate, modulation scheme and FFT size; are well known features of wireless communication methods. Each of these parameters will affect the latency or transmission time and varying these parameters will affect the communication quality, such as PER.

The code rate may e.g. be 1/2, 2/3, 3/4 or 5/6, wherein a code rate of 2/3 indicates that 1/3 is redundant data and a corresponding latency of 1/3 is created.

The modulation scheme can be selected e.g. as BPSK, QPSK or 16QAM corresponding to modulation orders 2, 4 and 16, respectively, where BPSK denotes Binary Phase-Shift Keying, QPSK is Quadrature Phase-Shift Keying, and 16QAM is 16-Quadrature Amplitude Modulation.

FFT size (Fast Fourier Transform) is the number of samples of every OFDM symbol, not counting the cyclic prefix, typically 32, 64, 128, 256, or 512. The impact of FFT size on the latency is not as straightforward as the impact from code rate and modulation scheme, as will be seen in equation 1. The FFT size will affect latency, as can be seen in eq. 1, however in dependence of the other physical layer parameter settings. Also, FFT size does in general not have an effect on reliability.

A total latency can be calculated for example as a total transmission time of a standard sized message in the communication network; a transmission time can for example be provided for each route by adding the transmission time for each link of the route and the processing time for each relaying node.

The process can be seen as using a first quality criterion for the selection of a suitable cyclic prefix, using a second quality criterion for combining a selected cyclic prefix with further parameters, preferably code rate, FFT size and/or modulation scheme, and for those parameter combinations fulfilling the first and second quality criterions, making a selection based on comparisons of the latency of the parameter combinations, wherein the parameter combination with the lowest latency, or shortest transmission time, is selected for the link.

Figure 3A:
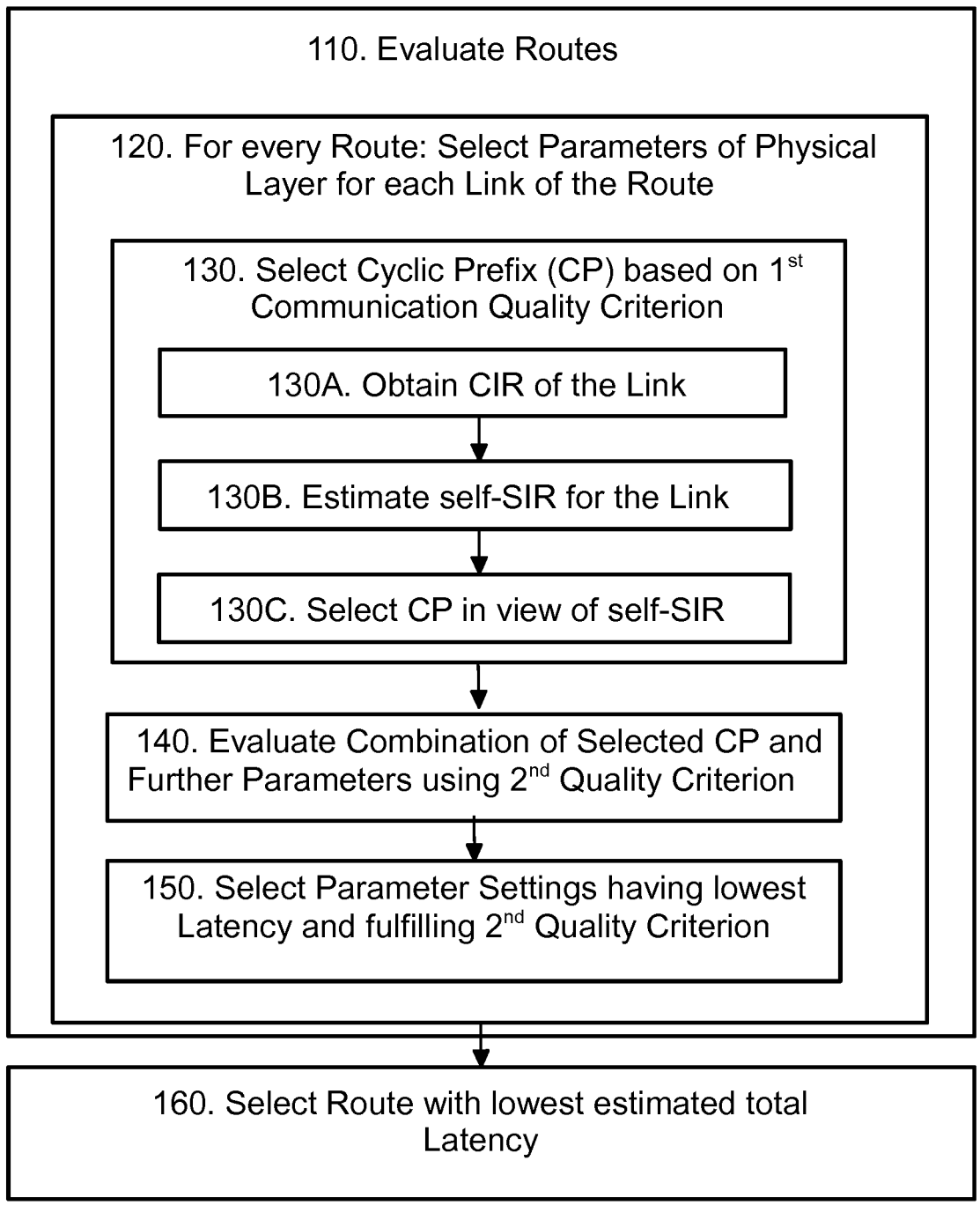
FIGS. 3A-C illustrate further embodiments of the method of FIG. 2.
Figure 3B:
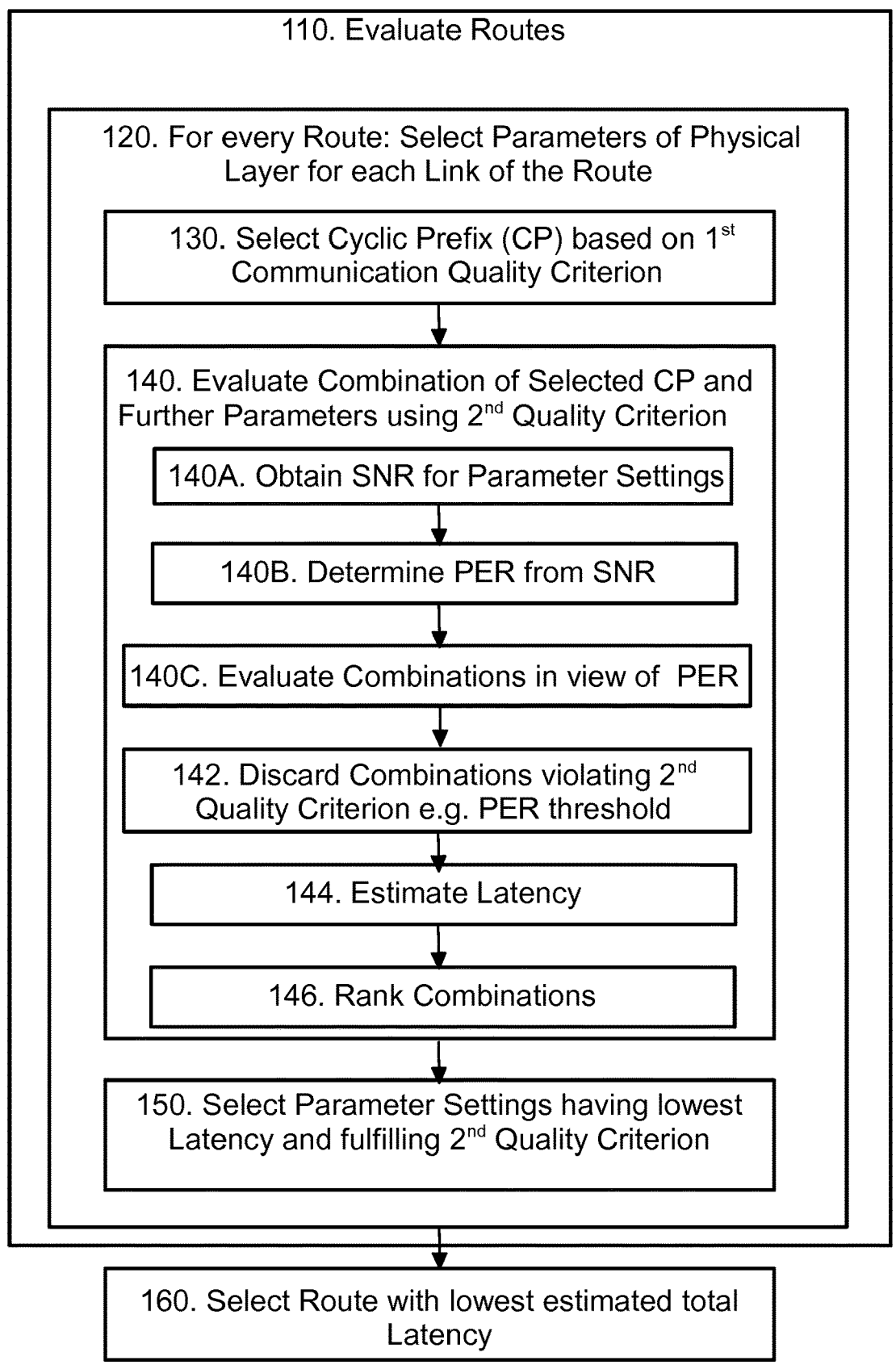
Figure 3C:
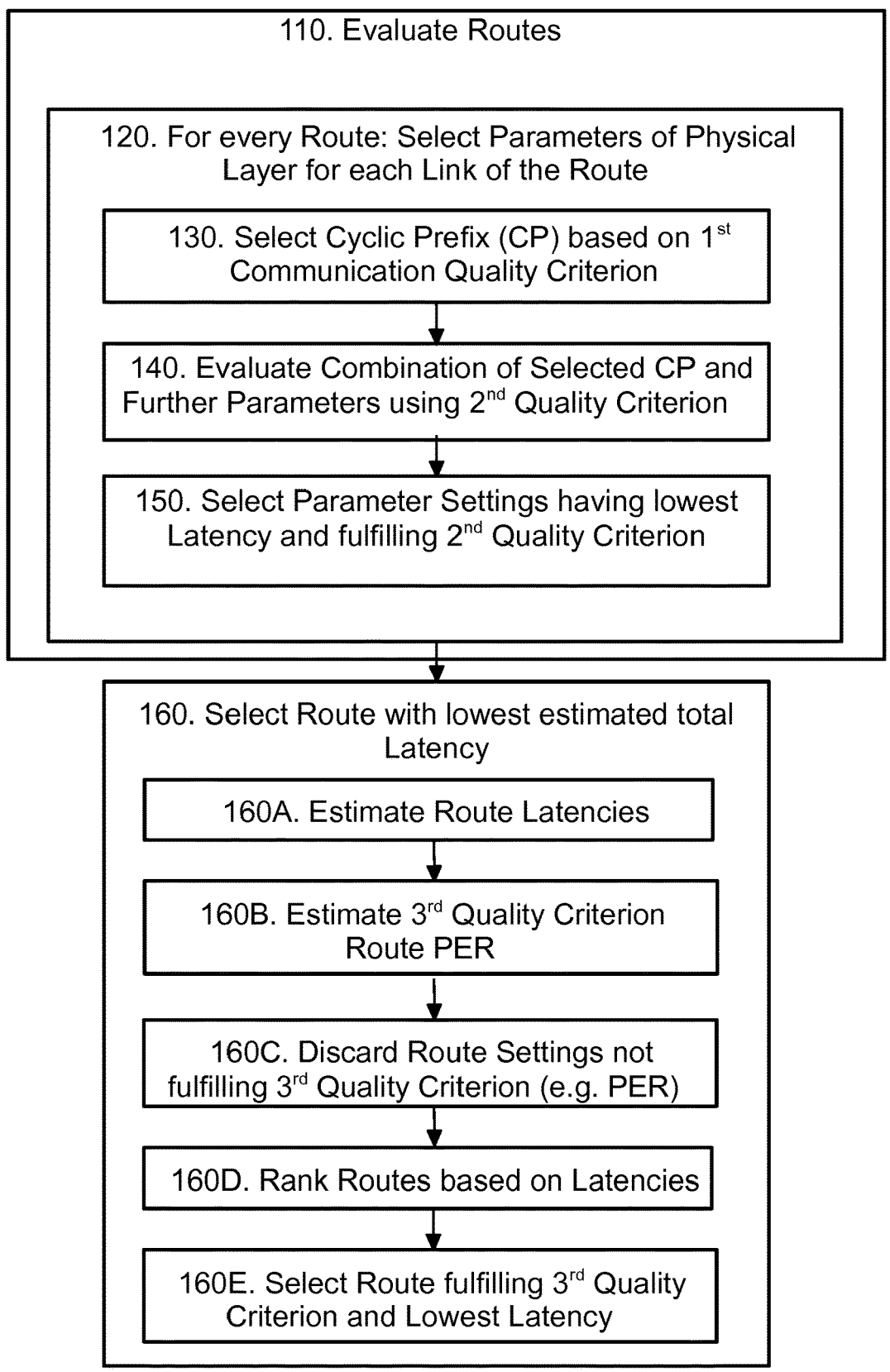

A further embodiment of the route selection method 100 is illustrated in FIGS. 3A-C. Especially, FIG. 3A illustrates the selecting 130 of cyclic prefix and FIG. 3B illustrates the evaluating 140 of combinations of the selected cyclic prefix and further parameter settings in more detailed embodiments.

The selecting 130 of cyclic prefix in view of the first communication quality criterion comprises obtaining 130A the channel impulse response (CIR) of the link. For this purpose, the network controller 10 may be configured to instruct each base station 1-4 to send test signals and to pick up the test signals sent from the other base stations 1-4. From such test signal sequences, a signal-to-self-interference ratio (self-SINR) can be derived for different lengths of cyclic prefix, so that a cyclic prefix fulfilling a criterion for self-SINR can be subsequently selected. For example, a cyclic prefix that provides a self-SINR of, for example, at least 10 dB or, preferably about 20 dB or higher, can be selected. A criterion for self-SINR is a preferred communication quality criterion in order to limit, or avoid, self-induced inter-symbol interference. The embodiment of FIG. 3A includes estimating a self-SINR, and using self-SINR as a criterion for selecting the length of the cyclic prefix. The selection 130 of cyclic prefix is based on a criterion of a self-SINR as communication quality criterion and includes estimating 130B a self-SINR for the link and selecting 130C cyclic prefix in view of the self-SIR; for example, selecting a cyclic prefix corresponding to a self-SINR of 10 dB at least, or approximately 20 dB or higher.

The evaluation 140 of the combination of selected cyclic prefix and further parameter, or parameters, of the physical layer in view of a second communication quality criterion includes determining 140B a packet-error-rate (PER) of the link for different parameter settings. To determine 140B PER for different parameter settings, simulations of different parameter settings can be performed. Alternatively, the determining 140B of PER can be made from the signal-to-noise ratio of the link. Depending on which physical layer parameters are evaluated, an estimation or computation of the PER can be provided from SNR, for example a higher modulation order will be more sensitive to SNR than a lower resulting in a higher PER for a higher modulation order. The determining 140B of PER may suitably also be based on the previously established self-SINR, which correspond to the selected cyclic prefix. The SNR of the link is obtained through preliminary information, for example the transmitted power and the channel bandwidth, as well as from the obtained CIR in step 130A.

The method further includes using the determined PER as the second communication quality criterion. Thus, the combination of selected cyclic prefix and further parameters is evaluated 140C in view of a threshold for the PER. The method continues with discarding 142 parameter settings that in combination with the selected cyclic prefix does not fulfil the PER threshold. The method includes estimating 144 latency of those combinations of cyclic prefix and further parameter settings that fulfil the PER threshold criterion.

The selection 150 of parameter settings includes selection of the combination that fulfil the second quality criterion, i.e. the PER threshold, and has the lowest latency/transmission time.

Different methods can be used for estimating and/or comparing transmission times. For example, calculation of a latency or packet transmission time ($T_{pkt}$) for an OFDM communication network is described in M. Luvisotto, Z. Pang, D. Dzung, M. Zhan and X. Jiang, "Physical Layer Design of High-Performance Wireless Transmission for Critical Control Applications," in IEEE Transactions on Industrial Informatics, vol. 13, no. 6, pp. 2844-2854, December 2017.

$$T_{pkt} = T_s \cdot (N_{FFT} + N_{cp}) \cdot \left( N_{sym}^{pre} + \left\lceil \frac{\text{bits}}{(N_{FFT} - N_{ndsc}) \cdot \log_2 M \cdot R_c} \right\rceil \right) \quad \text{eq. 1}$$

Wherein:
$N_{FFT}$ is the FFT size; the number of non-CP samples for each OFDM symbol, and is typically a power of 2 for efficient implementation, e.g. 32, 64, or 128;
M is modulation order, for BPSK M=2, for QPSK M=4, for 16QAM M=16, and $\log_2 M$ is the actual number of bits per sample in OFDM;
$R_C$ is the code rate; ratio between number of bits to transmit (including redundant bits) and coded bits, e.g. 1/2, 2/3, 3/4.
The present invention suggests varying the FFT size ($N_{FFT}$), the modulation order (M) and/or the code rate ($R_C$), preferably all three, together with the selection of CP in order to optimize latency and reliability of each link.
Further in eq. 1:
$N_{cp}$ is the number of samples in the CP; corresponding to the CP length selected in step 130;
$T_s$ is the time required to transmit one sample over the air and depends on the sampling frequency and bandwidth of the hardware used;
$N_{sym}^{pre}$ is the number of OFDM symbols in the preamble;
$N_{ndsc}$ is the number of non-data samples for each OFDM symbol (for example to provide guard bandwidth, pilots, correcting DC offset);
"bits" is the number of bits to transmit;
The transmission time for each link of the route may subsequently be added together with the processing times of the relay nodes to provide a total latency of the route.

FIG. 3C illustrates embodiments of selecting 160 the route having lowest estimated latency, and includes estimating 160A the latencies of the different routes, including transmission times and processing times. The selection 160 of route may be performed in view of a third communication quality criterion, such as a threshold for the total PER of each route. The selection 160 of route of FIG. 3C includes estimating 160B a route communication quality, such as PER, discarding 160C route settings that does not fulfil the third communication quality criterion, such as a PER threshold for the route, and selecting 160E the route that has the lowest latency among the routes that fulfil the third communication quality criterion. The selection 160 of the route with lowest latency may also include ranking 160D the routes based on the estimated route latencies, especially ranking the routes that fulfil the third communication quality criterion, i.e. the route PER threshold.

Figure 4:
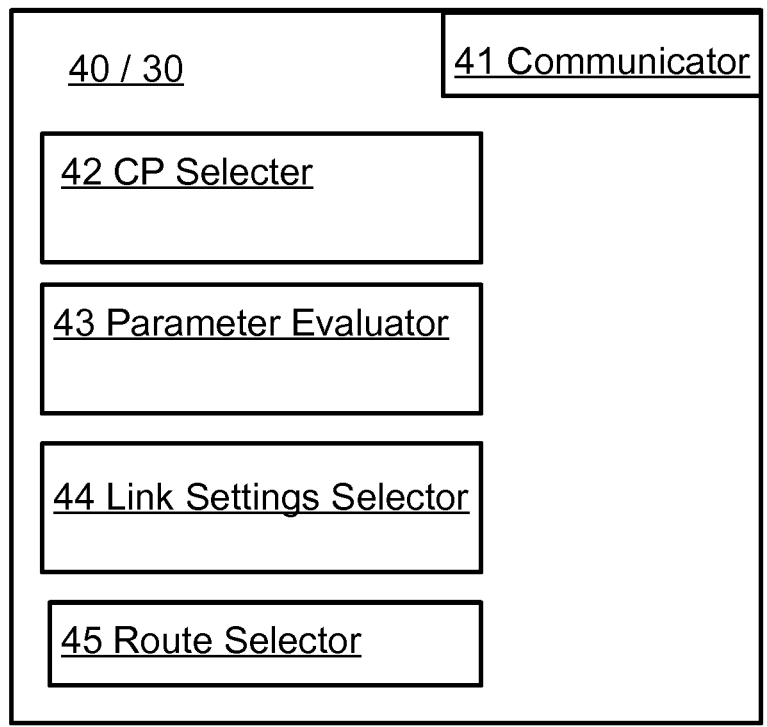
FIG. 4 illustrates a network control system configured to perform route selection according to any of the embodiments of FIGS. 2, 3A-C.

The method 100 of route selection may be performed by a control system, such as a network controller 30 unit, a control system distributed among two or more nodes, or base stations, 1-4 of the network 10, or separately arranged control system in a communication system communicatively connected to the wireless communication network 10, such as via Internet. An example of such a control system 40 is illustrated in FIG. 4. The control system 40 is a computer-based system including processing and memory means providing the functions of the route selection method 100, and includes a communicator 41 for communication with nodes 1-4 of the wireless communication network 10, and is configured with:
- a CP selector 42 in order to perform the step of selecting 130 of CP in view of a first communication quality criterion;
- a parameter evaluator 43 in order to evaluate 140 the selected CP with further parameters of the physical layer;
- a link settings selector 44 in order to select 150 the parameter settings that provide the lowest estimated latency and also fulfils the second communication quality criterion, and
- a route selector 45 in order to select 160 the route that provide the lowest latency, and preferably fulfil a third communication quality criterion.

The control system 40 may be implemented in a single unit, such as a network controller 30. FIG. 4 also illustrates a computer program product 50 in the form of a CD for storing the computer program. Such a computer program is provided that when run on one or more computers, such as a network controller 30 or a control system 40, will make the computer, e.g. controller 30 or control system 40, perform the described route selection method 100, preferably including one or more of the specific embodiments A method 100 of route selection in a wireless communication system and a control system 40 configured to perform the method has been described in embodiments. The method includes selecting a route between a first node 1 and a second node 2 and comprises:
- evaluating 110 a plurality of possible routes R1, R2, R3, R4, at least one route R2, R3, R4 including a third node 3, 4 between the first and the second node; and
- selecting 160 the route that has the lowest latency among the possible routes. Especially the method 100 includes:
- selecting 120 parameter settings for each link of the possible routes, said selecting 120 comprising;
  - selecting 130 the length of the cyclic prefix,
  - evaluating 140 combinations of the selected cyclic prefix and different settings of the at least one further parameter of the physical layer;
  - selecting 150 the parameter settings that has lowest estimated latency and fulfils at least one communication quality criterion The present invention is not limited to these embodiments, but may be varied within the scope of the claims.

The invention claimed is:

1. A method of selecting a route for wireless communication between a first node and a second node in a wireless communication system comprising a physical layer where a cyclic prefix and at least one further parameter apply, the method comprising:
   evaluating a plurality of possible routes from the first node to the second node, at least one route of the possible routes including a third node between the first node and the second node, wherein the at least one route includes at least two links and wherein the evaluating comprises selecting parameter settings for each link of the possible routes by:
      selecting a length of the cyclic prefix for the link in view of a first communication quality criterion for minimizing or avoiding inter-symbol interference;
      evaluating combinations of the selected length of the cyclic prefix and different settings of the at least one further parameter of the physical layer, wherein the evaluating includes estimating the latency of the link; and
      selecting the parameter settings for the link that have lowest estimated latency; and
   selecting the route that has the lowest latency among the possible routes including adding together the latency for each link of the route and, for each route having a third node between the first node and the second node, adding a processing time of the third node of the route;
   wherein evaluating the possible routes includes determining a packet error rate for the combinations and discarding such parameter settings that in combination with the length of the selected cyclic prefix do not fulfil a packet-error-rate threshold.

2. The method according to claim 1, wherein the first communication quality criterion is a criterion for signal-to-self-interference ratio of the link.

3. The method according to claim 1, wherein the at least one further parameter comprises any of code rate, modulation scheme and FFT size.

4. The method according to claim 1, wherein the at least one further parameter comprises two of code rate, modulation scheme and FFT size.

5. The method according to claim 1, wherein the at least one further parameter comprises code rate, modulation scheme and FFT size.

6. The method according to claim 1, wherein selecting the cyclic prefix comprises:
   obtaining a channel impulse response of the link; and
   estimating a signal to interference and noise for the link from the channel impulse response.

7. The method according to claim 6, wherein a signal to interference and noise criterion comprises that a signal is at least 10 dB stronger than noise and interference.

8. The method according to claim 6, wherein a signal to interference and noise criterion comprises that a signal is at least 20 dB stronger than noise and interference.

9. A control system for a wireless communication system comprising circuitry configured to perform the method of route selection according to claim 1.

10. The control system according to claim 9, comprising a network controller configured to perform the method of route selection.

11. A computer program product comprising a non-transitory computer readable storage medium storing a computer program for controlling a wireless communication system, the computer program, when run on a network control system that includes computing means and communication means, causes the network control system perform the method of route selection according to claim 1.

12. A control system for a wireless communication system comprising:
- a network controller;
- a non-transitory computer readable storage medium storing a computer program for selecting a route for wireless communication between a first node and a second node in a wireless communication system that comprises a physical layer where a cyclic prefix and at least one further parameter apply, the computer program, when run on the network controller, causing the control system to perform a method of route selection comprising:
  - evaluating a plurality of possible routes from the first node to the second node, at least one route of the possible routes including a third node between the first node and the second node, wherein the at least one route includes at least two links and wherein the evaluating comprises selecting parameter settings for each link of the possible routes by:
    - selecting a length of the cyclic prefix for the link in view of a first communication quality criterion for minimizing or avoiding inter-symbol interference;
    - evaluating combinations of the selected length of the cyclic prefix and different settings of the at least one further parameter of the physical layer, wherein the evaluating includes estimating the latency of the link; and
    - selecting the parameter settings for the link that have lowest estimated latency; and
  - selecting the route that has the lowest latency among the possible routes including adding together the latency for each link of the route and, for each route having a third node between the first node and the second node, adding a processing time of the third node of the route;
  - wherein evaluating the possible routes includes determining a packet error rate for the combinations and discarding such parameter settings that in combination with the selected length of the cyclic prefix do not fulfil a packet-error-rate threshold.

13. The control system according to claim 12, wherein the network controller comprises a processor and a transceiver.

14. The control system according to claim 12, wherein the first communication quality criterion is a criterion for signal-to-self-interference ratio of the link.

15. The control system according to claim 12, wherein the at least one further parameter comprises any of code rate, modulation scheme and FFT size.

16. The control system according to claim 12, wherein the at least one further parameter comprises two of code rate, modulation scheme and FFT size.

17. The control system according to claim 12, wherein the at least one further parameter comprises code rate, modulation scheme and FFT size.

18. The control system according to claim 12, wherein selecting the cyclic prefix comprises:
- obtaining a channel impulse response of the link; and
- estimating a signal to interference and noise for the link from the channel impulse response.

* * * * *